United States Patent Office 2,792,734
Patented May 21, 1957

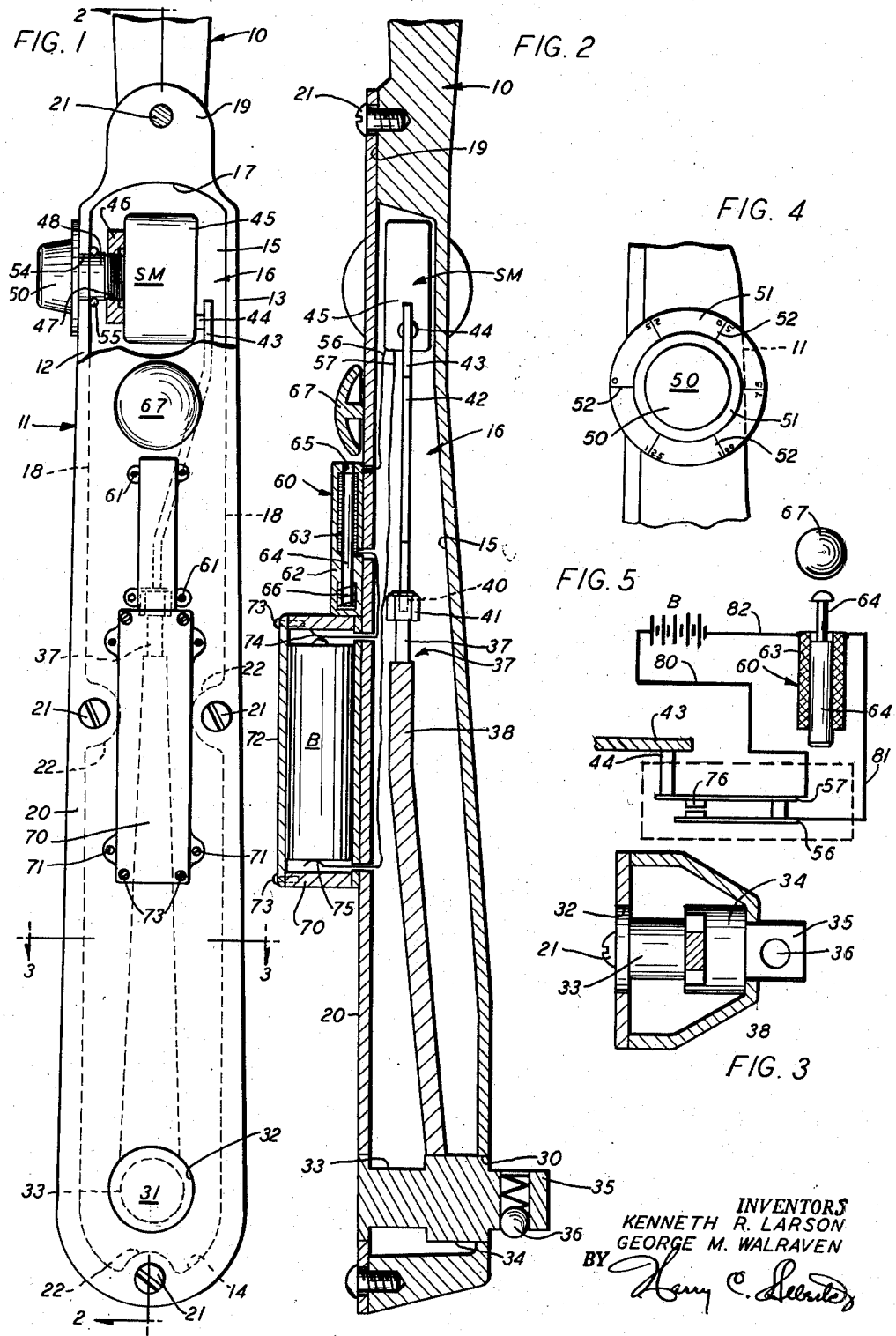

2,792,734

PRE-SET TORQUE INDICATING WRENCH

Kenneth R. Larson, Des Plaines, Ill., and George M. Walraven, Kenosha, Wis., assignors to Snap-On Tools Corp., Kenosha, Wis., a corporation of Delaware Application June 22, 1955, Serial No. 517,163

7 Claims. (Cl. 81—52.5)

The present invention relates to turning devices and more particularly to torque measuring and indicating wrenches of the type shown and described in United States Letters Patents Nos. 2,312,104, 2,367,224 and 2,682,796 dated February 23, 1943, January 16, 1945, and July 6, 1954 respectively, although certain features of the invention may be employed with advantage for other purposes.

Although most torque wrenches operate upon the principle of measuring the flex in a beam which resists the manual turning force utilized in nut turning and similar operations, the present torque wrench, as well as those shown and described in the above mentioned patents, utilize the degree of twist deformation in a shank or shaft as the measuring expedient for such nut turning operations inasmuch as this type of wrench has been found to give better results in that a higher degree of accuracy can be expected due to the elimination of lag and free play between the relatively moving parts, as well as a substantial reduction in friction due to the transmission of torque through a shortened torque path.

It has been found in actual use that operators of torque wrenches which embody the usual dial indicators for measuring and indicating the degree of applied torque may not be too observant of the indicator dial or they may work in positions of difficulty or under strain and in such inaccessible places that there is little opportunity to read the indicator dial which, in fact, at times may be totally obscured from vision. Furthermore, reliance upon the accurate reading of indicator dials and the like under any circumstances is open to human error. For these reasons, torque wrenches which rely solely upon the reading of a dial or other indicator of the applied torque have not been entirely dependable.

The present invention is designed to overcome the above noted limitations that are attendant upon the use of present day torque wrenches and, toward this end, it contemplates the provision of a wrench in which the usual dial indicator mechanism has been completely eliminated and in its stead there has been substituted a clearly audible signal which at the proper time becomes effective to transmit to the operator the knowledge that the predetermined degree of manual applied torque for which the instrumentality has been set has been attained.

In United States Patent No. 2,682,796 above referred to, there is disclosed a torque wrench having associated therewith torque load presetting means whereby visual, audible and physical indications of the attainment of a predetermined degree of torque application are given to the operator. Such wrenches have been found useful under limited working conditions but in certain instances, particularly where the operator is working under handicaps of noise, cramped working quarters, in the presence of obstacles, or a combination of these factors, the visual indication may be concealed or not readily visible to the operator, or the audible indication may be confused with or lost in the noise level of the working surroundings, while the physical indication may pass unnoticed due to extraneous vibration or shock taking place at the time the physical signal is given. The torque wrench of the present invention has been designed as an improvement over the torque wrench shown in this patent in that the visual indicating means has been completely eliminated and reliance for an indication that the proper torque level has been attained is based solely upon the provision of an audible signal which is sonorous and resonant and thus clearly audible regardless of the surrounding noise level at the time the indication is given.

The provision of a torque wrench of the character briefly outlined above being among the principal objects of the invention, another object is to provide a torque wrench wherein the audible signal or indication is effected by independently energizable electrical means capable of energization when a predetermined torque level has been attained and operable, when so energized, to sound an audible signal such as a bell which is sufficiently sonorous that its tone will not be confused with ordinary machine or machine shop noises.

In carrying out the last mentioned object the invention contemplates the provision of a torque wrench having the usual movable torque responsive displacement rod or lever associated therewith. Displacement of the rod in response to the application of torque serves to close a pair of normally open contacts which are arranged in an electrical circuit in series with a solenoid and a source of electrical energy such as a battery. The movable core of the solenoid carries a striker element which, upon energization of the solenoid, is caused to strike a bell and thus sound the audible signal. The normally open contacts are associated with a microswitch of the type having an extremely sensitive actuating button which requires but little force to cause closure of the contacts and this button is positioned directly in the path of movement of the displacement rod and is adapted to be engaged and depressed by the latter when a predetermined displacement of the rod is attained. The actuating button offers no appreciable degree of resistance to the actuating force exerted by the rod and thus an extremely sensitive and accurate response by the mechanism to the predetermined degree of torque is attainable. Means are provided for bodily shifting or adjusting the position of the microswitch toward and away from the displacement rod to vary the amount of displacement of the rod that is necessary to effect closure of the electrical contacts and by such an arrangement accurate control of the torque characteristics of the tool within very fine limits is attainable.

The provision of a torque wrench of this character which is possessed of a minimum number of moving parts and which therefore is unlikely to get out of order; one which is devoid of the usual delicate dial instrumentalities ordinarily associated with torque wrenches that rely upon visual indicating means for their proper operations and which therefore is comparatively rugged and durable; one which is compact and of light weight in its construction and which therefore may be more easily manipulated; one which is capable of ease of assembly and disassembly for the purpose of inspection, replacement of parts or repair, and one which may be manufactured at a relatively low cost are further desirable features that have been borne in mind in the production and development of the present invention.

Other objects and advantages of the invention, not at this time enumerated, will become more readily apparent as the nature of the invention is better understood.

In the accompanying single sheet of drawings a preferred embodiment of the invention has been shown.

In these drawings:

Fig. 1 is a plan view of a torque wrench constructed in accordance with the principles of the present invention.

Fig. 2 is a sectional view taken substantially along the line 2—2 of Fig. 1.

Fig. 3 is a sectional view taken substantially along the line 3—3 of Fig. 2.

Fig. 4 is an enlarged fragmentary side elevational view of a portion of the structure shown in Fig. 1 in the vicinity of a presetting knob employed in connection with the invention, and Fig. 5 is a circuit diagram of the electrical instrumentalities associated with the improved torque wrench.

The structure selected for illustration is not intended to serve as a limitation upon the scope or teachings of the invention, but is merely illustrative thereof. There may be considerable variations and adaptations of all or part of the teachings depending upon the dictates of commercial practice.

The improved torque wrench illustrated herein involves in its general organization a solid handle member 10 of standard construction having an elongated chambered wrench shank or body 11 cast or otherwise shaped to present inclined side walls 12 and 13 and terminating in a semicircular top or head extremity 14. The handle 10 with its integral chambered wrench body 11 is preferably, though not essentially, cast from an aluminum alloy so as to possess the desired strength and lightness for convenience and manipulation in nut turning as will appear more fully hereinafter. It is to be noted that the side walls 12 and 13 converge in the direction of the handle 10 and they also converge toward the bottom wall 15 which is formed integral therewith to define an elongated chambered interior 16. It should also be noted that since the side walls 12 and 13 not only converge toward the handle but also toward the bottom wall 15 as stated above and as shown in Fig. 2, define a compact and well balanced casing or body capable of ease of handling in actual service.

The side walls 12 and 13 terminate in the vicinity of the handle 10 in a curved extremity 17 which, together with the curved top extremity 14 and the bottom wall 15 define the elongated chamber 16. The open side of the chamber 16 is defined by a continuous rim 18 which terminates near the handle 10 in a flat shelf portion 19. The chamber 16 is adapted to be closed by a generally flat steel cover plate 20 which conforms in shape to the contour of the rim 18 and which is secured in position on the body 11 by means of suitable fastening screws 21 which extend into reinforced bosses 22 provided on the side walls 12 and 13 and into the shelf portion 19 respectively. The cover plate 20, side walls 12 and 13 and bottom 15 define the chamber 16 therebetween and serve to confine, at least in part therein, the torsion displacing and indicating instrumentalities which will subsequently be described. It is to be noted that the cover plate 20 is of such a width that it is sufficiently rigid to withstand substantially all of the turning load applied to the torque wrench while the casing afforded the shank 11 is not employed to sustain any appreciable turning load, this casing serving primarily to confine the measuring instrumentalities and to protect them against foreign substances and impact against neighboring objects.

The semicircular head portion 14 of the shank body 11 is formed with a circular recess 30 therethrough through which there is adapted to project a cylindrical torque applying body or turning member 31. The member 31 may be formed as an integral part of the cover plate 20 or, as illustrated, one end thereof may be secured as by welding in an opening 32 provided in the cover plate in axial alignment with the opening 30. The member 31 is provided with a reduced cylindrical portion 33 adjacent its region of attachment to the cover plate and with an enlarged cylindrical portion 34 having a diameter substantially equal to the diameter of the opening 30 so that this portion of the member 31 may project through the opening 30 in substantially sealing engagement therewith. The projecting portion of the member 31, exteriorly of the casing 11, may be squared or is otherwise of polygonal design and constitutes a wrench socket receiving extremity 35. A spring pressed detent 36 of standard construction is provided in one face of the polygonal shank 35 for cooperation with a suitable recess provided in the wrench socket or other turning implement which may be telescoped thereon for retention against accidental displacement.

The cylindrical torque applying member 31 which is rigidly attached to the cover plate is preferably formed of flexible steel capable of slight torsional twisting when extremely heavy torque loads are applied to the same. In order to measure the torque load applied to the extremity 35 by manipulation of the handle 10, the extent of twist or torsional deformation set up in the reduced cylindrical portion 33 of the member 31 may be utilized as the determining factor. This torsional deformation of the cylindrical member 31 will vary substantially in direct proportion to the turning load applied through the handle 10 providing, of course, that it is within the elastic limit of the material of which the cylindrical member 31 is formed. The rotational displacement of the cylindrical portion 34 is scarcely noticeable in the vicinity of the member 31 but it may be measured and utilized to perform useful work, as for example the sounding of an audible signal, by means of a radially extending displaceable rod assembly 37 having an inner portion 38 secured at one end to the enlarged portion 34 of the body 31. The free end of the rod portion 38 is provided with a reduced extension 39 having a socket 40 formed in the end thereof. Fitted in the socket 40 and secured therein by means of a fastening nut 41 is an actuating finger 42 in the form of an elongated rod having an offset end portion 43 designed for engagement with the operating button 44 of a microswitch assembly $Sm$ which may be of conventional construction and which is adjustably mounted within the chamber 16 adjacent the inner end thereof and in the vicinity of the handle 10.

The microswitch $Sm$ is positioned in close proximity to the bottom wall 15 of the casing and may comprise the usual Bakelite or other insulating casing 45 to which there is secured at one side thereof a bracket 46 having a threaded opening 47 therein adapted to threadedly receive the shank 48 of an adjusting knob 50 (see Fig. 4) having a radial flange 51 provided with suitable calibrated numerals 52 designed for cooperation with an indicia mark 53 provided on one side wall of the casing 11. The calibrated numerals may represent in pounds the amount of torque which may be applied to the fastening device before the sounding of an audible signal in a manner that will be described presently. The adjusting knob assembly is maintained in position within an opening 54 provided in the side wall 12 of the casing 11 by means of a snap ring 55.

The microswitch $Sm$ which is shown in more detail in Fig. 5 is provided with the usual contact terminals 56 and 57 and the switch is disposed in an electrical circuit in series with a solenoid designated in its entirety at 60 (Figs. 2 and 5) and with a source of electrical energy as for example a battery B. The solenoid 60 is mounted on the cover plate 20 in any suitable manner as for example by fastening screws 61 and consists of an outer casing 62 and an inner winding 63 in which there is slidably disposed a core or plunger 64. One end of the casing is provided with an opening 65 therein through which the core 64 is adapted to be projected upon energization of the winding 63. The core 64 is maintained in a retracted position within the casing 62 by means of a spring 66.

Positioned in register with the opening 65 and in close proximity thereto is a resonant member in the form of a bell 67 adapted to be engaged by the plunger 64 when the latter is projected through the opening 65.

The battery B which may be in the form of a conventional dry cell battery of the one and one-half volt variety is mounted within a rectangular housing 70 which may be secured to the cover plate 20 by means of fastening screws 71. A removable cover 72 for the housing 70 serves to conceal the battery B and may be removably held in position by means of anchoring screws 73. Disposed within the housing 70 in spaced relation are the usual battery mounting terminal strips 74 and 75 respectively designed for engagement with the negative and positive poles of the battery.

In the operation of the torque wrench, the polygonal shank 35 is adapted to receive thereover a torque applying tool instrumentality such as a socket wrench of the proper size to accommodate the element to be tightened which may be an automotive cylinder head bolt or the like. The socket wrench is applied to the bolt in the usual manner of application and tightening torque is applied to the shank 35 by swinging the handle 10 in the proper direction about the longitudinal axis of the torque applying member 31. As the cylinder head bolt or other element becomes tightened upon its seat, torsional stress is applied to the cylindrical member 31 through the sole medium of the cover plate 20 and this torsional stress is assimilated within the member 31 itself and results in a limited amount of torsional deformation or twist thereof. The amount of such torsional deformation is substantially in direct proportion to the applied torque load so that the enlarged portion 34 of the member 31 will assume a slight angular displacement from its free position with respect to the longitudinal axis of the cover plate 20. Such angular displacement of the cylindrical portion 34 of the member 31 is transmitted through the elongated rod assembly 37 and results in an accentuated displacement of the offset portion 43 of the rod extension 42. Depending upon the initial spaced distance existing between the free end of the operating button 44 of the microswitch Sm and the offset portion 43, as regulated by the setting of the dial knob 50, the microswitch will be actuated to close its contacts when a predetermined torque load has been attained and such closure of these contacts will operate to energize the solenoid 60 and cause the plunger 64 to engage the resonant member 67 or bell and thus give an audible signal so that the operator may terminate the application of torque to the element undergoing tightening.

The above described operation of the torque wrench is diagrammatically illustrated in Fig. 5 wherein the microswitch Sm is generally illustrated by the dotted rectangle and is provided with internal normally open contacts 76. Upon engagement and depression of the actuating button 44 by the offset extension 43 of the rod assembly 37, the contacts 76 become closed and an electrical circuit is established extending from the positive side of the battery B through lead 80, contacts 76, lead 81, winding 63 of the solenoid 60 and lead 82 to the negative side of the battery. Energization of the solenoid winding 63 causes the plunger 64 to be projected from its retracted position so that the end thereof engages the resonant member or bell 67 to sound the audible signal. As soon as the torque load is relieved the torsionally deformed member 31 is restored to its normal condition and the offset portion 43 of the rod extension 42 is moved out of contact with the operating button 44 of the microswitch Sm so that the contacts 76 again become open to permit the plunger 64 to assume its retracted position under the influence of the spring 66.

While there has been illustrated and described a preferred embodiment of the invention, it must be understood that the invention is capable of considerable modification without departing from the spirit of the invention. For example, although the electrical circuit which includes the normally open pair of contacts 76 has been employed for the purpose of causing an audible signal to be sounded when a predetermined torque load has been applied to the torque wrench, this work circuit may be put to other uses, as for example, the rendition of a visible signal or the like. The invention therefore is not to be limited to the precise details of construction set forth and such variations and modifications as come within the scope of the appended claims may be taken advantage of if desired.

What is claimed is:

1. In a torque wrench of the character described, an elongated rigid handle member, a torsionally deformable torque applying work engaging member having one end thereof rigidly secured to one end of said handle member and adapted to yield in response to a countertorque load applied to the other end thereof, an elongated actuatng torsion responsive rod having one end secured to said work engaging member and extending along said handle member in close proximity thereto for displacement of the other free end thereof in proportion to the torsional deformation of said work engaging member, a pair of normally open contacts carried by said handle, a depressible operating finger for said contacts operable upon depression thereof to close the contacts, said finger being positioned as a unit with said normally open pair of contacts in the path of movement of the free end of said torsion responsive actuating rod and designed for engagement thereby when a predetermined displacement of the same is attained, and an electrical work circuit including a source of current supply in which said pair of contacts are operatively disposed.

2. In a torque wrench of the character described, an elongated rigid handle member, a torsionally deformable torque applying work engaging member having one end thereof rigidly secured to one end of said handle member and adapted to yield in response to a countertorque load applied to the other end thereof, an elongated actuating rod having one end secured to said work engaging member and extending along said handle member in close proximity thereof for displacement in proportion to the torsional deformation of said work engaging member, a pair of normally open contacts carried by said handle, a depressible operating finger for said contacts operable upon depression thereof to close the contacts, said finger being positioned in the path of movement of the free end of said actuating rod and designed for engagement thereby when a predetermined displacement of the same is attained, means for adjusting the position of said operating finger and said normally open pair of contacts to move the same as a unit toward and away from the free end of said actuating rod to vary the amount of displacement of the latter required to close said contacts, and an electrical work circuit including a source of current supply in which said pair of contacts are operatively disposed.

3. In a torque wrench of the character described, an elongated rigid handle member, a torsionally deformable torque applying work engaging member having one end thereof rigidly secured to one end of said handle member and adapted to yield in response to a countertorque load applied to the other end thereof, an elongated actuating rod having one end secured to said work engaging member and extending along said handle member in close proximity thereof for displacement in proportion to the torsional deformation of said work engaging member, an enclosed insulated microswitch movably mounted on said handle and having a depressible operating finger and a pair of normally open contacts adapted to become closed when the operating finger is depressed, said finger and contacts being a unit assembly positioned in the path of movement of the free end of said actuating rod and designed for engagement thereby when a predetermined displacement of the same is attained, means for shifting said microswitch bodily toward and away from the free end of said actuating rod to vary the amount of displacement of the latter required to close said contacts, and an electrical work circuit for said microswitch including a source of current supply.

4. In a torque wrench, the combination with an elongated handle member, of a torque responsive work engaging member operatively associated in torque transmitting relation with one end of said handle member, an elongated rod anchored at one end to said head member and extending along the handle member for displacement in proportion to the torque turning load on said work engaging member, means establishing an electrical circuit, a pair of normally open contacts disposed in said circuit, means engageable with the free end of said actuating rod and operable to close said contacts when a predetermined displacement of the rod is attained, said engageable means and normally open pair of contacts being in fixed relative relation to each other, an electrically operable device disposed in said circuit operable upon energization thereof to sound an audible signal, and a source of energizing current for said circuit, and means for shifting said engageable means and contacts as a unit relative to the free end of said actuating rod to preset the degree of displacement of said actuating rod necessary to effect the closure of said contacts.

5. In a torque wrench, the combination set forth in claim 4 wherein said electrically operable device is in the form of a solenoid having a winding operatively disposed in said electrical circuit and a normally retracted core movable upon energization of said winding to an advanced position, and a resonant member positioned in the path of movement of said core and adapted to be engaged thereby upon movement of the core toward its advanced position.

6. In a torque wrench, the combination with an elongated handle member, of a torque responsive work engaging member operatively associated in torque transmitting relation with one end of said handle member, an elongated rod anchored at one end to said head member and extending along the handle member for displacement in proportion to the torque turning load on said work engaging member, means establishing an electrical circuit, a pair of normally open contacts disposed in said circuit, means engageable with the free end of said actuating rod and operable to close said contacts when a predetermined displacement of the rod is attained, unitary means for varying the position of said engageable means and said pair of contacts to preset the degree of displacement of said actuating rod necessary to effect closure of said contacts, an electrically operable device disposed in said circuit operable upon energization thereof to sound an audible signal, and a source of energizing current for said circuit.

7. In a torque wrench, the combination set forth in claim 6 wherein said electrically operable device is in the form of a solenoid having a winding operatively disposed in said electrical circuit and a normally retracted core movable upon energization of said winding to an advanced position, and a resonant member positioned in the path of movement of said core and adapted to be engaged thereby upon movement of the core toward its advanced position.

References Cited in the file of this patent
UNITED STATES PATENTS

| | | |
|---|---|---|
| 2,250,941 | Zimmerman | July 29, 1941 |
| 2,440,683 | Hattan | May 4, 1948 |
| 2,474,247 | Hattan | June 28, 1949 |
| 2,486,103 | Billeter | Oct. 25, 1949 |
| 2,537,997 | Hattan | Jan. 16, 1951 |